United States Patent Office 3,042,518
Patented July 3, 1962

3,042,518
LIGHT SENSITIVE PHOTOGRAPHIC
COMPOSITIONS
Eugene Wainer, Cleveland Heights, Ohio, assignor to Horizons Incorporated, Cleveland, Ohio, a corporation of New Jersey
No Drawing. Filed Jan. 8, 1960, Ser. No. 1,161
11 Claims. (Cl. 96—48)

This invention relates to compositions which are sensitive to light and suitable for photography and photographic reproduction purposes. More particularly, the invention relates to the production of stable print-out and developable-out images produced by exposing to light and to light and heat, films comprising combinations of N-vinyl compounds, organic compounds containing chlorine and/or bromine, and inorganic iodine compounds of the alkalies and the alkaline earths, all suitably mixed and disposed in a suitable base and to the novel films utilized in the production of said images.

Objects of this invention are to effect a reaction as the result of exposure to light between N-vinyl compounds, bromine and/or chlorine derivatives of organic compounds, and inorganic iodine compounds with specific reference to compounds of alkalies and the alkaline earths, so that an intensely colored modification is produced as the result of the foregoing reaction; to develop this color forming reaction solely through use of exposure to ultraviolet light or visible light for times sufficient that a colored, gray or black image of high contrast is obtained; to provide systems which on exceptionally short exposure to either ultraviolet or visible light will produce a substantially non-visible latent image which is subsequently made visible without affecting the non-light struck areas by heating or by treating with infrared; to provide systems in the exposure, development, and fixing stages which may be processed by totally dry techniques; and, it is a further object of the invention to establish systems in which the desired color is developed by exposure to light and the facility for producing such a color as a result of exposure to light of a similar wavelength is either destroyed by exposure of the system to strong infrared or is rendered incapable of producing an image when a specific combination of ultraviolet light and infrared is imposed on the film.

In my copending application, Serial No. 787,112, filed January 16, 1959, there are described photographic compositions which could be processed dry composed of combinations of arylamines, organic halogen compounds, and plastic film forming bases. In another of my copending applications, Serial No. 841,459, filed September 22, 1959, means for developing color print-out effects using indicators disposed in the plastic base and combined with certain organic halogen compounds were further described. In still another copending application, Serial No. 841,460 also filed September 22, 1959, fixing techniques through the addition of specific sulfur compounds to the foregoing combinations were defined. In another specification, Serial No. 842,569, there are defined photographic compositions composed of combinations of arylamines, N-vinylamines and organic halogen compounds all disposed in a suitable plastic base.

Except for the inorganic iodine compounds, the photosensitive systems about to be described are substantially those disclosed in the several copending applications noted above. Essentially such systems comprise constituents from the following groups of materials:

Solvent
Resin or plastic base
N-vinyl compound
Organic halogen compound
Inorganic iodine compound
Organic acid [1]
Sulfur compound [1]
Photosensitizer to visible light [1]
Ultraviolet absorber [1]
Plasticizer [1]

Suitable members of each group are described below by way of illustration but it will be understood that similar compounds may be substituted without departing from the intended scope of the invention.

I have now found that the addition of certain inorganic iodides, iodates, and periodates to a combination of N-vinyl compound and organic bromine and/or chlorine compounds suitably disposed in a plastic or synthetic resin base, with or without the addition of sulfur compounds as described in the above noted specifications, and with or without the sensitizers to the visible as also described in my previous specifications, not only radically increases the sensibility of the system to production of a photographic effect as a result of exposure to ultraviolet or visible light, but also makes the system capable of producing a substantially non-visible latent image capable of being subsequently developed to full density by use of heat or infrared as the result of continuing chemical reactions on the latent image initially formed at high photographic speeds. It is difficult to define the photographic speed of the system just described in exact terms, but relatively speaking, this may be defined by the fact that normally photographic reactions having an overall quantum yield of one with a specific light system will require 60 seconds to several minutes of exposure, in order to produce a fully developed image, there being no latent image available. With the same type of light, the systems described in the present specification will produce latent images under exposure times of fractions of a second, and development to achieve full density is obtained by heating in a specified temperature range for periods varying from 5 seconds to 1 minute, from which it may be inferred that the overall quantum yield of the reaction is considerably in excess of one.

The heating action also exhibits the feature of simultaneous fixing of the unexposed areas. Again, as before, if exposure times are used comparable to those required in the processes described in the aforesaid copending applications where only arylamines and organic halogen compounds are present as the sensitive agents, namely, exposure times in the region of 1 to 10 seconds, then a full print-out image of high density is obtained. Through use of the novel compositions described in the present application, such color is still further deepened in hue by infrared fixing and stabilization obtained as the result of such infrared fixing.

As a result of the high photographic speed achieved through the addition of the inorganic iodides, iodates, or periodates to the system described above and compris-

[1] Optional.

ing in combination: N-vinyl compounds and organic compounds of bromine or chlorine suitably disposed in a plastic or synthetic resin base, it is possible to use these photographic compositions not only for document reproduction, office photocopy, line copy work, but also in direct camera work for the recording of the images and visual events in the manner commonly utilized in a camera with a silver halide sensitive surface.

Suitable plastic or synthetic resin bases in which the photosensitive materials described in this specification may be dispersed are listed in Table 1. While oxygen-containing synthetic resins may be used, the oxygen-free types are preferred. In the presence of oxygen-containing synthetic resins, a very slow dark reaction takes place so that with such resins the photosensitive composition should be exposed and used within about two days after it is prepared, in order to be effective. A similar dark reaction does not take place in the oxygen- or hydroxyl-free synthetic resin.

TABLE 1
*Synthetic Resin Solutions*

| Number | Synthetic Resin | Solvent |
| --- | --- | --- |
| 1 | polystyrene | trichloroethylene. |
| 2 | polyvinyl chloride | tetrahydrofuran. |
| 3 | cellulose acetate | {30 methylene dichloride. 70 acetone. |
| 4 | cellulose nitrate | {30 ethyl alcohol. 70 ethyl ether. |
| 5 | ethyl cellulose | trichloroethylene. |
| 6 | polyvinyl acetate | {50 toluene. 50 acetone. |

As plasticizers, tricresylphosphate, dioctylphthalate, or chlorinated biphenyl may be used with the above synthetic resins.

N-vinyl compounds suitable for the purposes of my invention includes the N-vinylamines, N-vinylamides and N-vinylimides which are listed in Table 2. These are compounds in which the vinyl grouping is always attached directly to a nitrogen.

TABLE 2
N-vinylcarbazole
N-vinylphenyl-alpha-naphthylamine
N-vinyldiphenylamine (stabilized with 0.1% NaOH)
N-vinylindole
N-vinylpyrrole
N-vinylpyrrolidone
N-vinylsuccinimide
N-vinylphthalimide
N-vinylacetanilide
N-vinylphenylacetamide
N-vinylmethylacetamide
N-vinyldiglycolylimide As described in my application Serial No. 842,569, the combination of N-vinyl compound and a suitable organic halogen compound properly disposed in a plastic base will generally produce a latent image on exposure to ultraviolet light, and will yield after suitable heat treatment, images of a pale or washed out color or the development of insolubility or opacity.

While I do not wish to be bound to any specific theory, it appears that an important portion of the ability to produce a latent image in the absence of inorganic iodine compounds is due to the presence of the polymerizable N-vinyl compound and it appears proper to consider that the image obtained is available at high speed even though the eventually heat developed image is weak in tinctorial power, it being clear that a very substantial development in the photographic sense has taken place as the result of such development.

While it is possible to use these N-vinyl compounds as photographic compositions in the presence of organic halogen compounds and in the absence of the inorganic iodine compounds, where the images are primarily made visible only as the result of subsequent heating at speeds comparable to the print-out mechanisms found initially with combinations of arylamines and organic halogen compounds where the color prints out directly, both the speed and the color density of the end result are of somewhat limited utility.

I have now found that in systems consisting essentially of both an N-vinyl compound and an organic bromine or chlorine compound, suitably disposed in a plastic or synthetic resin base, when controlled amount of anhydrous compounds or mixtures of anhydrous compounds taken from the group consisting of alkali and alkaline earth iodides, iodates, and periodates are added to the photosensitive systems herein disclosed in anhydrous condition, a totally unexpected result is obtained. Such a system may be sensitized for subsequent development by heat or infrared with extraordinary short exposures to ultraviolet light, and if sensitizers to the visible are incorporated, these short exposures may be obtained with visible radiation. In addition, it is found that the system is still compatible with the sulfur compounds for fixing by exposure to moist air as previously described in my application Serial No. 841,460.

The initial exposure to ultraviolet or visible light produces no perceptible change in color in the photosensitive composition. At best an extremely faint gray or faint brown may be seen, but it requires very close examination to establish that the color is actually produced. On subsequent heating, very deep gray-blacks, brown-blacks, blue-blacks, and other colors develop out, in times of 10 to 60 seconds at temperatures between 90 and 120° C.

While this system may be used as a direct print-out by relatively lengthy exposure to light without the subsequent exposure to infrared, the colors obtained by direct print-out techniques are not as dense or as dark in hue as those obtained by subsequent heating. It appears that as the result of exposure to ultraviolet light, a reaction between the N-vinyl compound and the organic halogen compound takes place, producing a change in chemistry in either the N-vinyl compound or a reaction product of the N-vinyl compound and the organic halogen compound. On subsequent heating, this light-modified compound then possesses the capability of reacting with inorganic iodides, iodates, or periodates or combinations thereof to produce a darkly colored compound. The portion of the film which has not been struck by light is not capable of undergoing this secondary reaction.

Organic halogen compounds found to be suitable for the purposes of my invention are: carbon tetrabromide, hexachloroethane, tetrabromobutane, hexachlorobenzene, and tetrachlorotetrahydronaphthalene. Each of these it will be noted is a halogenated hydrocarbon in which the active bromine or chlorine atom is attached to a carbon to which there is attached not only more than a single hydrogen atom and that as described in my application 787,112, the activation energy of the halogen free-radical is the important determining factor in the suitability of the hydrocarbon for the present process. It appears that in order for the halogenated hydrocarbon to be effective in the present process it must have an energy of dissociation or in other words an energy of formation of the free halogen radical of not less than 40 kilogram calories per mole. Each of the halogen compounds indicated above as preferred, it will be noted, is a halogenated hydrocarbon in which at least one active halogen (Cl or Br) is attached to a carbon atom having not more than one hydrogen atom attached thereto. A number of other organic halogen compounds are suitable, but these usually are available only as relatively low boiling point liquids, and while they are effective in solvent form, they are academic for use in dry films. It is significant to note that organic iodine compounds are not suitable as the organic halogenating compound when used alone. In the subsequent heat treatment of the composition, organic compounds of iodine do not produce the highly contrasting image available when the organic halogenating compound is an organic compound of bromine or chlorine.

The inorganic iodine compounds suitable for the purposes of my invention are the alkali and alkaline earth iodides, iodates, and periodates in anhydrous condition. Preferably these are the iodides of sodium, potassium, calcium, and barium; the iodates of these element; and the periodates of these elements. In order for the compositions in which these are disposed to have suitable shelf stability, these compounds are placed in the photographic mixture in the dry condition. This is accomplished by heating the powdered material in an oven at 130° to 150° C. for at least one hour before compounding.

These inorganic iodide, iodate, and periodate compounds are normally only sparingly soluble in organic solvents. The usual technique for making them available to the composition is to dry them completely at temperatures of the order of 130 to 150° C. until all water has been removed, and allow the material then to cool in a desiccator. The dired iodine compounds are then placed in a ball mill and ground to extreme fineness in a mixture of roughly 80 parts of toluene and 20 parts of dry acetone, and the grinding is continued until the portion which does not go into solution in such a reagent has been reduced to a particle size in the range of 1 to 10 microns. Usually 10% dispersions are made in this manner. Under such conditions, solubilities to the extent of 1 to 2% are obtained in the majority of cases with the exception of the sodium iodide compound which dissolves quite extensively in the toluene-acetone mixture, though a completely clear solution is not normally obtained. The combination of dissolved material and finely dispersed, finely divided material is effective for the purposes of this specification.

The activity of these inorganic iodine compounds with respect to speed and density of development is enhanced to a notable degree by the addition of minor amounts of weak organic acids such as citric, cinnamic, fumaric, succinic, adipic, and itaconic acids. Usually an amount of such acid equivalent to about half the content of the inorganic iodine compound used represents the maximum needed for this improvement in speed and amounts as little as 5% of the amount of iodine compound are effective. In the absence of the inorganic iodine compound, the addition of these organic acids does not produce any noticeable result.

The maximum amount of inorganic iodine compound which I have found necessary in such compositions is generally equivalent to about half the amount of the organic bromine or organic chlorine compound used for initiating the original light induced reaction, and as little as 10% of the organic halogen compound is found to be effective.

As indicated in the aforementioned applications, ultraviolet absorbers may be incorporated to increase photographic speeds in the ultraviolet and sensitizers to the visible similar to those previously described in my earlier applications may also be utilized. A preferred sensitizer to visible light is N-N' dimethylphenylazoaniline. Preferred ultraviolet absorbers include benzil, benzoin, stilbene derivatives, benzophenone derivatives and the like.

When a postive-positive process is involved or when fixing is by other means than through the use of heat, sulfur compounds such as thiourea, thioacetamide, thiocarbanalide, dedecanethiol or zinc sulfide may be used. The addition of these compounds is generally not contemplated when a negative-positive process is being employed.

The preferred ranges of compositions for the completed photographic composition are given in Table 3. Usually to prepare the compositions, the film-forming plastic or synthetic resin is first dissolved in its solvent. The N-vinyl compound is then added, followed by the organic halogen compounds. All other additions which may be required for a specific end purpose are subsequently added and thoroughly mixed with or dissolved in the photosensitive composition before the final addition of the inorganic iodine compound dispersion. Under these conditions, the photographic "dope" is quite stable for lengthy periods of time if retained in a dark brown bottle. If, however, the inorganic iodine compounds have not been thoroughly dried before addition to the photographic composition, the stability in dope form is limited, fogging or dark reactions taking place in the bottle after a few days.

TABLE 3

*Preferred Composition Ranges of Ingredients (Based on 100 Parts by Weight of Resin or Plastic Base)*

| Ingredient: | Parts by weight (range) |
|---|---|
| 1. Solvent for resin or plastic | 500 to 1000 |
| 2. N-vinyl compound | 10 to 200 |
| 3. Organic halogen compound | 10 to 200 |
| 4. Inorganic iodine compound | 5 to 100 |
| 5. Organic acid | [1] 0 to 50 |
| 6. Sulfur compound | [1] 0 to 30 |
| 7. Photosensitizer to visible | [1] 0 to 1.0 |
| 8. Ultraviolet absorber | [1] 0 to 1.0 |
| 9. Plasticizer | [1] 0 to 100 |

[1] Optional constituent.

After the materials have been dissolved in their respective solvents or dispersed therein, the thoroughly stirred mixture is cast or spread in thin film form on a substrate such as glass, paper, plastic film, and the like, and allowed to dry in the dark, after which the composition is ready for subsequent exposure.

The following examples are indicative of the practice of my invention and are to be construed as illustrative of preferred embodiments of the invention and in nowise limitative thereof.

EXAMPLE 1

One hundred grams of bone dry sodium iodide is added to a mixture of 800 cc. of dry benzene and 200 cc. of dry acetone. This mixture is placed in a ball mill and ground for three hours. The finely dispersed cloudy suspension is placed in a stoppered bottle until ready for use.

In a separate container, 10 grams of polystyrene is added to 100 cc. of trichloroethylene and allowed to stand with occasional shaking until the polystyrene has passed completely into solution. Under a red safe light, to this solution are added successively, each being dissolved before the next addition is made, 10 grams of carbon tetrabromide and 10 grams of N-vinylcarbazole. Then 50 cc. of the sodium iodide dispersion in the mixture of benzene and acetone are added and the whole is fairly stirred and placed in a brown colored bottle. The dispersion is spread on a glass surface of such thickness that on drying in the dark, a film thickness of roughly 2 mils is obtained.

After thorough drying in the dark, the dried film is then exposed through a negative to a 275 watt ultraviolet mercury lamp at a distance of 10 inches, a shuttered exposure of approximately 0.1 second being utilized.

After removal from the camera, examination in dim light indicates that no visible image has been produced. The film is then placed on a piece of white paper, coated side up and exposed to a 250 watt reflector type infrared lamp at a distance of 10 inches for a period of 45 seconds. A deep brown-black image of high contrast develops out in the areas which have been previously struck by light, whereas the unexposed areas remain water-white and clear. If the infrared exposure is continued for another minute, the previously ultraviolet exposed areas turn to an opaque black, and again the unexposed areas show substantially no change in color. A further infrared exposure of 60 seconds starts to develop fog in the unexposed areas.

EXAMPLE 2

Same as Example 1 except that polyvinyl chloride dissolved in tetrahydrofuran was used in place of the polystyrene dissolved in trichloroethylene. Images similar in color and density were obtained in this case as in Example 1 in about the same length of time of exposure and heat development.

EXAMPLE 3

Same as Example 1 except that the inorganic iodine compound used was sodium iodate of formula $NaIO_3$ and 40 cc. of the benzene-acetone dispersion equivalent to about 4 grams of sodium iodate was used in place of the 50 cc. of the sodium iodide dispersion used in Example 1. A full density image after ultraviolet exposure developed in this case in exposure to the infrared lamp in about 30 seconds and fogging started to become evident in about 70 seconds of infrared lamp treatment.

EXAMPLE 4

One hundred grams of potassium periodate in the bone dry condition was ground in a ball mill with a mixture of 800 cc. of dry toluene and 200 cc. of dry acetone, the grinding being continued for approximately three hours. In a separate container, 10 grams of polystyrene was dissolved in a mixture of 80 cc. of toluene and 20 cc. of acetone. After solution was complete and under a red safelight, 10 grams of hexachloroethane was dissolved therein, followed by the addition of 10 grams of N-vinylpyrrolidone. After solution was complete, 50 grams of the potassium periodate dispersion was added and the batch vigorously stirred until all possible solution had taken place. After spreading and drying and ultraviolet exposure as in Example 1, 20 seconds of heat treatment after the ultraviolet exposure was sufficient to produce an image of high contrast, and this image was further capable of being heated for 40 seconds longer before fogging of the background developed.

EXAMPLE 5

One hundred grams of dry calcium iodate of formula $Ca(IO_3)_2$ was ground in a ball mill in 800 cc. of benzene and 200 cc. of acetone for three hours. In a separate container, 10 grams of polyvinyl acetate was added to a mixture of 40 cc. of methyl alcohol, 40 cc. of acetone, and 20 cc. of toluene and stirred until completely dissolved. Thereafter and under a red safelight, 10 grams of tetrabromobutane, 10 grams of N-vinylcarbazole, and 1 gram of citric acid were added successively to the plastic dope, each material being dissolved completely before the next addition. Finally 50 cc. of the calcium iodate dispersion was added and the whole stirred until the dispersion was uniform. This was spread on a glass plate and exposed to the ultraviolet light as in the preceding examples. About 30 seconds of treatment under the infrared lamp was sufficient to yield an image of high density and the image was stable to further treatment under infrared for an additional 100 seconds before fogging of the background developed.

EXAMPLE 6

Ten grams of ½ second cellulose nitrate was dissolved in 200 cc. of a mixture of 60 cc. of ethyl alcohol and 140 cc. of ethyl ether. Successively 10 grams of carbon tetrabromide and 10 grams of N-vinylcarbazole was added, each being completely dissolved before the next addition was made. Finally, 10 cc. of the sodium iodide dispersion prepared in accordance with Example 1 (equivalent to about one gram of solid sodium iodide) was added and the mixture stirred vigorously and spread on glass plates as before. After drying and exposure to the ultraviolet light indicated in Example 1, heat transfer under the ultraviolet lamp developed out a brown-black image of high contrast in about 10 seconds, and this image remained stable without fogging to the background on further exposure to the infrared lamp for about 45 seconds longer.

EXAMPLE 7

A photosensitive film was prepared as in previous examples by mixing the following ingredients under a red safelight and spreading the resulting composition on glass:

| | |
|---|---|
| 10% polyvinyl chloride solution in tetrahydrofuran _____ grams__ | 100 |
| N-vinylindole _____ do____ | 10 |
| Chlorinated biphenyl _____ do____ | 2 |
| Carbon tetrabromide _____ do____ | 10 |
| $KIO_3$ (10 grams per 100 cc. of 80:20 benzene:-acetone) _____ cc__ | 50 |

After film was dry, it was exposed for 0.1 second to ultraviolet lamp at a distance of 20 inches. No image was visible. Exposure under infrared lamp for 30 seconds caused a deep red-brown image to develop out.

EXAMPLE 8

The following ingredients were mixed under a red safelight:

| | |
|---|---|
| 10% polystyrene solution in trichloroethylene _____ grams__ | 100 |
| N-vinyldiphenylamine _____ do____ | 5 |
| Tricresyl phosphate _____ do____ | 2 |
| Carbon tetrabromide _____ do____ | 10 |
| $KIO_4$ (10 grams per 100 cc. of 80:20 mixture of benzene and acetone) _____ cc__ | 20 |

The resulting mixture was spread on glass to form a thin film as described in Example 1. After the film was dry, it was exposed for 0.1 second to ultraviolet lamp at distance of 20 inches. No image was visible. When exposed under infrared lamp for 30 seconds, a deep blue image develops out.

EXAMPLE 9

Additional samples of the dried film of Example 1 were exposed to ultraviolet lamp for 10 seconds and a green-black image, somewhat translucent, prints out directly. On heating under infrared lamp, image becomes opaque black.

Having now described my invention in accordance with the patent statutes, I claim:

1. A dry photographic film suitable for the production of visible images by exposure to a combination of light and heat, comprising (I) a film-forming plastic selected from the group consisting of cellulose derivatives and addition polymers; (II) an N-vinyl compound selected from the group consisting of N-vinylamines, N-vinylamides and N-vinylimides; (III) a halogenated hydrocarbon compound selected from the group consisting of halogenated hydrocarbon compounds having an energy of formation of a free halogen radical of not less than 40 kilogram calories per mol and in which at least one active halogen selected from the group consisting of chlorine and bromine is attached to a carbon atom having not more than one hydrogen atom attached thereto; and (IV) an inorganic iodine compound selected from the group consisting of alkali metal and alkaline earth metal iodides, iodates and periodates, there being between 0.1 and 2 parts by weight of N-vinyl compound, between 0.1 and 2 parts by weight of halogenated hydrocarbon, and between 0.05 and 1 part by weight of inorganic iodine compound each per part of film-forming plastic, by weight.

2. The composition of claim 1 which includes in addition thereto a weak organic acid, the amount of said acid being between about 5% and 50% by weight of the inorganic iodine compound.

3. The composition of claim 1 including in addition at least one additive selected from the group consisting of a sensitizer to visible light; an ultraviolet absorber; a plasticizer for the synthetic resin; and a sulfur compound.

4. The composition of claim 1 wherein the N-vinyl compound is selected from the group consisting of N-vinylcarbazole; N-vinylphenyl-alpha-naphthylamine; N-vinyldiphenylamine stabilized with 0.1% NaOH; N-vinylindole; N-vinylpyrrole; N-vinylpyrrolidone; N-vinylsuccinimide; N-vinylphthalimide; N-vinylacetanilide; N-vinylphenylacetamide; N-vinylmethylacetamide; N-vinyldiglycolylimide.

5. The composition of claim 1 wherein the halogen containing organic compound is selected from the group consisting of carbon tetrabromide, hexachloroethane, tetrabromobutane, hexachlorobenzene, and tetrachlorotetrahydronaphthalene.

6. The photographic film of claim 1 wherein the N-vinyl compound is selected from the group consisting of N-vinylcarbazole; N-vinylphenyl - alpha-naphthylamine; N-vinyldiphenylamine stabilized with 0.1% NaOH; N-vinylindole; N-vinylpyrrole; N-vinylpyrrolidone; N-vinylsuccinimide; N-vinylphthalimide; N-vinylacetanilide; N-vinylphenylacetamide; N-vinylmethylacetamide; and N-vinyldiglycolylimide; the organic halogenated hydrocarbon compound is selected from the group consisting of carbon tetrabromide, hexachloroethane, tetrabromobutane, hexachlorobenzene, and tetrachlorotetrahydronaphthalene and the inorganic iodine compound is selected from the group consisting of alkali and alkaline earth iodine containing compounds.

7. A method of producing an invisible latent image which comprises preparing a mixture of the composition of claim 1 in a solvent for the synthetic resin base, spreading the composition as a thin film on a suitable base; drying the film in the dark; and exposing the film to a pattern of ultraviolet light, whereby a latent image is produced which may be rendered visible by exposure to thermal radiation.

8. A method of producing a visible image which comprises preparing a mixture of the composition of claim 1 in a solvent for the synthetic resin base, spreading the composition as a thin film on a suitable base; drying the film in the dark; and exposing the film to a pattern of ultraviolet light, whereby a latent image is produced which may be rendered visible by exposure to thermal radiation and exposing the latent image to produce a visible image.

9. The composition of claim 6 wherein the organic halogen compound is $CBr_4$.

10. The composition of claim 6 wherein the N-vinyl compound is N-vinylcarbazole.

11. The composition of claim 6 wherein the inorganic iodine compound is an alkali metal iodide.

References Cited in the file of this patent

UNITED STATES PATENTS

| | | |
|---|---|---|
| 1,587,269 | Beebe et al. | June 1, 1926 |
| 2,072,465 | Reppe et al. | Mar. 2, 1937 |
| 2,276,840 | Hanford et al. | Mar. 17, 1942 |
| 2,789,052 | Elliott | Apr. 16, 1957 |
| 2,882,262 | Smith et al. | Apr. 14, 1959 |